United States Patent [19]

Chan

[11] Patent Number: 5,434,740

[45] Date of Patent: Jul. 18, 1995

[54] POWER ENTRY MODULE

[75] Inventor: Kin F. Chan, Lake Zurich, Ill.

[73] Assignee: Corcom, Inc., Libertyville, Ill.

[21] Appl. No.: 87,343

[22] Filed: Jul. 8, 1993

[51] Int. Cl.6 ............................................... H02B 1/18
[52] U.S. Cl. ..................................... 361/118; 361/56; 361/91
[58] Field of Search ................. 361/104, 118, 119, 91, 361/56, 728

[56] References Cited

U.S. PATENT DOCUMENTS

| | | | |
|---|---|---|---|
| 4,488,201 | 12/1984 | Webb et al. | 361/334 |
| 4,622,526 | 11/1986 | Schneider et al. | 333/181 |
| 4,685,028 | 8/1987 | Miller et al. | 361/334 |
| 4,761,623 | 8/1988 | Schneider | 333/167 |

*Primary Examiner*—Marc S. Hoff
*Assistant Examiner*—S. Jackson
*Attorney, Agent, or Firm*—Hill, Steadman & Simpson

[57] ABSTRACT

A power entry module of small size which can be mounted in a minimum size opening and which can also be provided with end or side extenders so that it can be mounted in larger openings. Alternately, a flange may be connected to the unit. A plug in filter unit and/or a plug in interconnection unit and/or a plug in surge suppressor unit can also be connected to the basic unit.

8 Claims, 2 Drawing Sheets

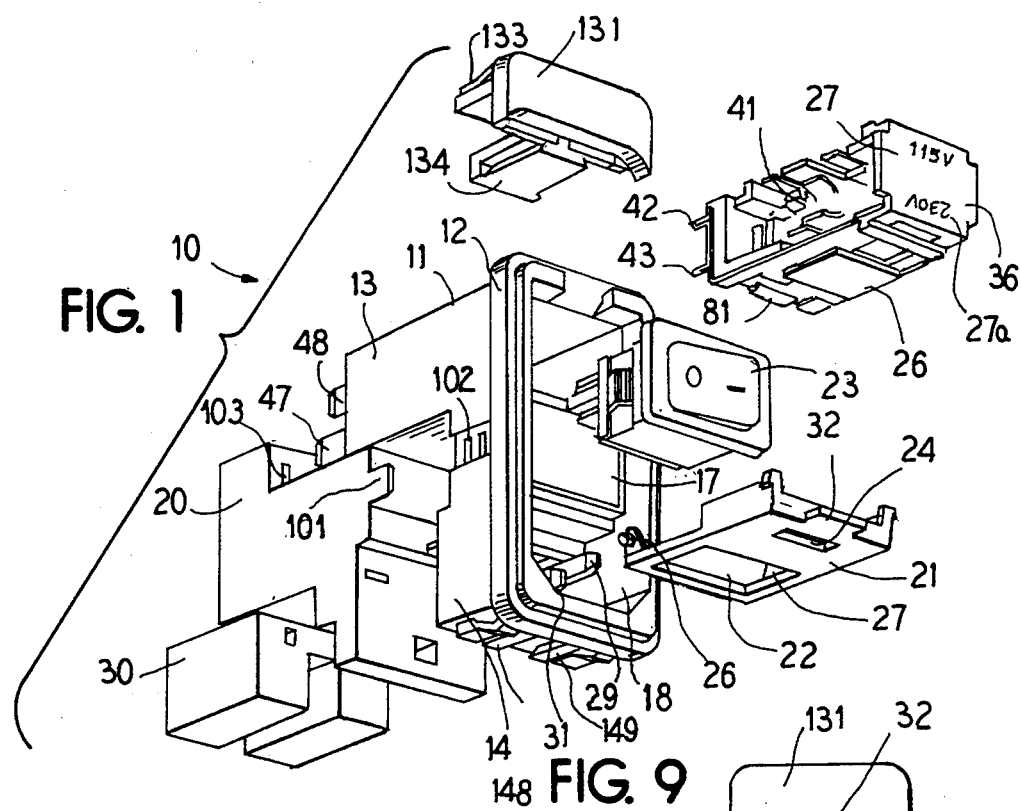
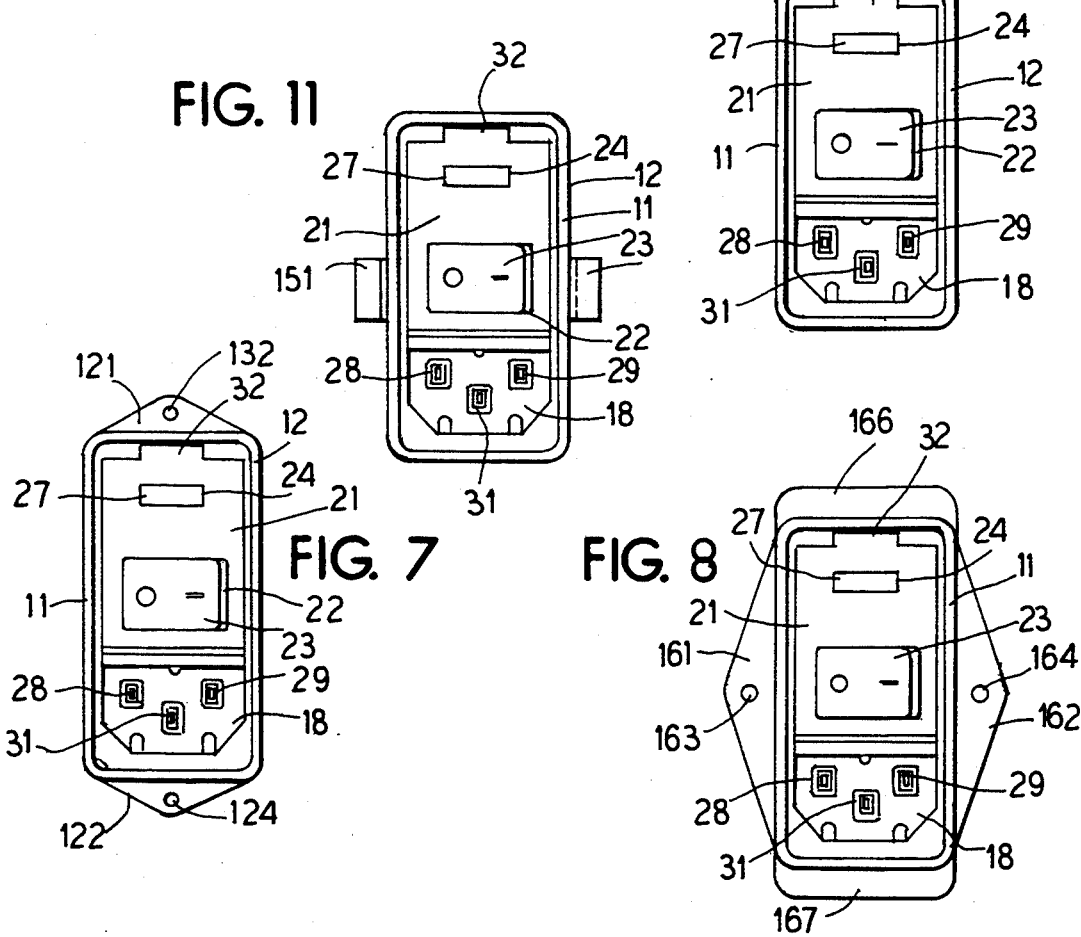

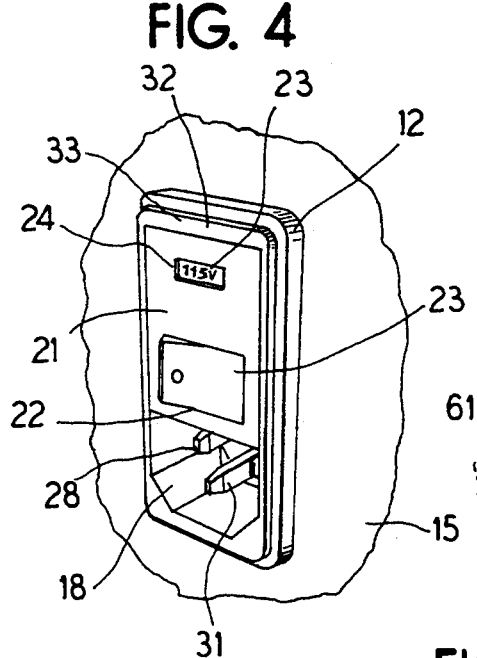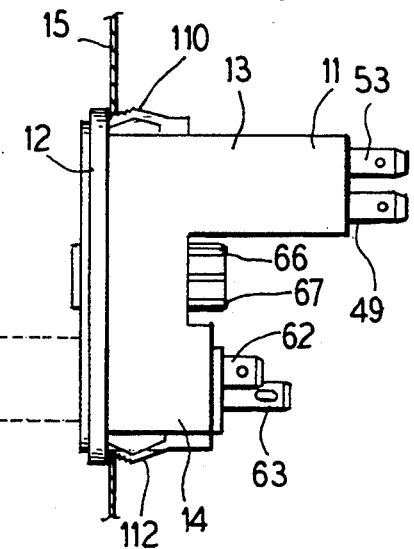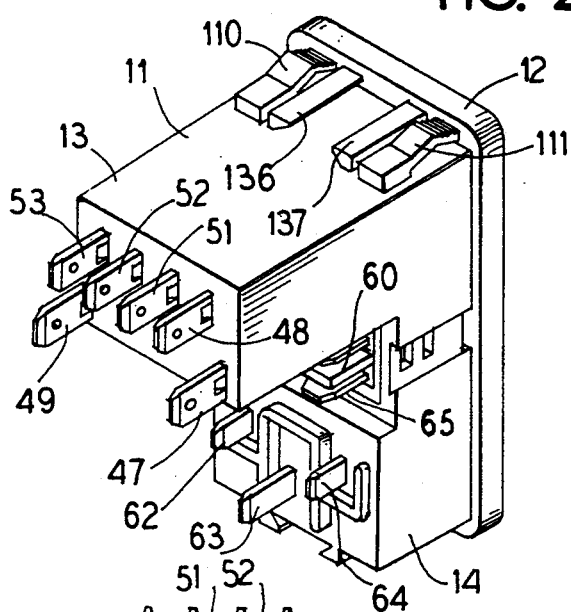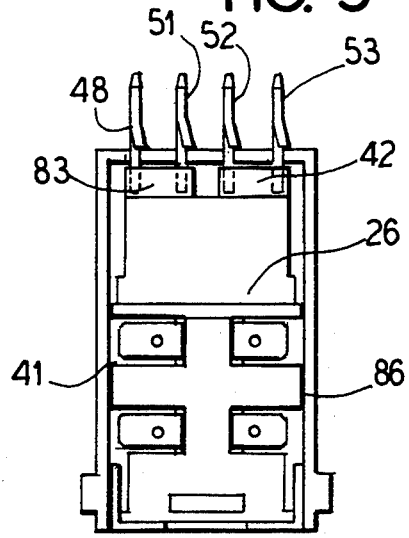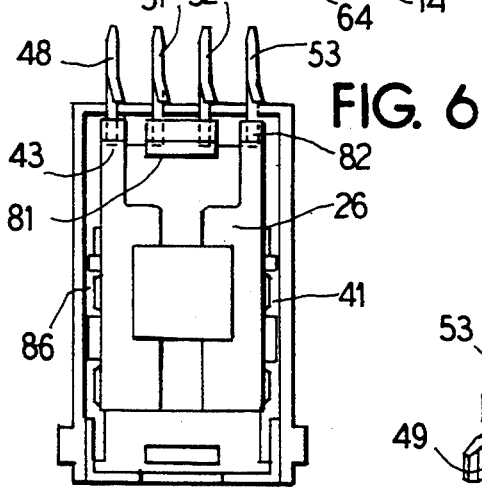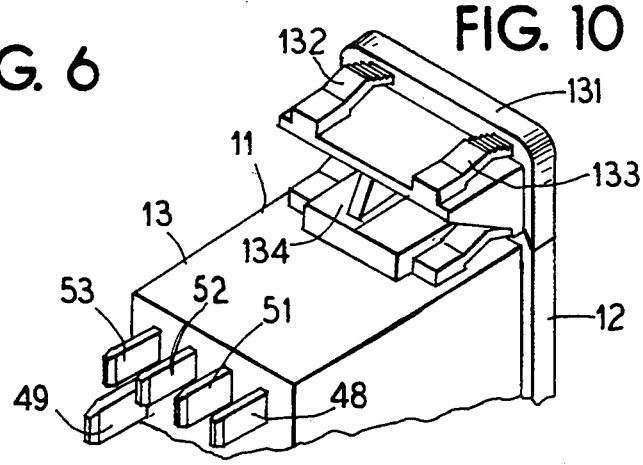

/ 5,434,740 /

POWER ENTRY MODULE

BACKGROUND OF THE INVENTION

1. Field of the Invention

This invention relates in general to a power module and in particular to a power entry module of small size which can be mounted in modular openings of longer or wider openings by using extenders that can be added to the top or the side of the module.

2. Description of Related Art

Power entry modules are known as, for example, as shown by U.S. Pat. No. 4,622,526 assigned to the assignee of the present invention. Such modules are used to connect and fuse an incoming power line to an equipment. Also, line filters are known for removing radio frequency interference on the power line as shown by U.S. Pat. Nos. 4,622,526 and 4,761,623 assigned to the assignee of the present invention.

SUMMARY OF THE INVENTION

It is an object of the present invention to provide a family of electronic components that combine several primary power functions such as line cord connector, fuse holder, power switch, voltage selector and RFI filter. The power entry module of the present invention allows voltage selection to be made with dual primary transformer, center tap transformer or switching power supply. The module of the invention meets international safety agencies approvals. The present invention is intrinsically safe since a line and cord must be disconnected to access fuses and voltage selector and cannot be connected while the door is opened and an on-off breaks both sides of the line.

The module of the invention fits the smallest modular width (J-series) and the smallest length (L-series). The unit can be fitted into larger openings in the panel by using flanges attached to the unit or by attaching length or side extenders to the unit.

A modular unit of the invention includes a basic unit which is adapted to receive one or more snap-in units so as to provide line filtering and/or surge suppression.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is an exploded perspective view of the invention;

FIG. 2 is a rear perspective view of the invention;

FIG. 3 is a side plan view of the basic module of the invention;

FIG. 4 is a perspective front view of the invention mounted in a panel;

FIG. 5 is a sectional view taken on line V—V from FIG. 2 illustrating the fuse holder in a first orientation;

FIG. 6 is a sectional view taken on line V—V from FIG. 2 illustrating the fuse holder in a second orientation;

FIG. 7 is a front plant view illustrating a flange mounting attached to the invention;

FIG. 8 is a front plan view illustrating a flange and extender modules attached to the invention;

FIG. 9 is a front plan view illustrating a length extender module attached to the invention;

FIG. 10 is a rear partially cut-away sectional view illustrating an end extender attached to the module; and FIG. 11 is a front plan view illustrating side extenders attached to the module.

DETAILED DESCRIPTION OF THE PREFERRED EMBODIMENTS

FIG. 1 illustrates the invention 10 which comprises a basic module 11 with an optional snap-on filter unit 20 and an optional surge suppressor unit 30. The basic module 11 is formed with a substantially horizontal leg 13 and a substantially vertical leg 14. A rim 12 passes around the front surface of the basic module 11 and a fuse holder receiver opening 16 is adapted for receiving a fuse holder 26. A switch holding receptacle 17 is adapted to receive an on-off switch 23. A safety door 21 is provided with pivot pins 26 and 25 and is pivotally connected to the front of the basic module 11. The safety door 21 is formed with an opening 22 which fits over the on/off switch 23 and has a tab 32 that is receivable in a slot 33 and is the lever for reopening the door A door locking device may be provided. An opening 24 is provided so that it is aligned with one of the indicias either 27 or 27a on the fuse holder 26 so as to indicate the voltage setting in the circuit. An opening 18 includes input prongs 28, 29 and 31 for receiving thereon an input connector 59 of a power cord 61 as illustrated in FIG. 3. The door 21 is pivoted such that when the door 21 is opened, the power plug 59 must be out of engagement with the prongs 28, 29 and 31 so as to provide a safety interlock such that power is not applied to the unit when the door 21 is opened such as when the fuse holder 26 is to be removed so as to change the fuses in the fuse holding slots 41 and 86 of the fuse holder.

The fuse holder 26 can be placed into the opening 16 in two orientations such as shown in FIGS. 5 and 6. In FIG. 5 which is a sectional view on line V—V from FIG. 2, a fuse holder is mounted in the opening 16 such that a pair of relatively wide rear tabs 42 and 83 extend to the rear of the unit so that tab 42 engages contacts 52 and 53 and tab 83 engages contacts 48 and 51. With this arrangement, the 115 volt setting will be in circuit and this will be indicated by the indicia 27 which will be visible through the window 24 in the door 21.

Alternatively, the fuse holder can be turned over so that a relatively narrow rear tab 43 will engage contact 48 and a relatively large tab 81 will engage contacts 51 and 52 and a relatively narrow tab 82 will engage contact 53 as shown in FIG. 6. Under these conditions, the 230 volt setting 86 will be in circuit.

The above is an example of the dual primary transformer type voltage selection. Different tab arrangement can be made to the fuseholder to accomplish the center tap transformer or switch power supply type voltage selection.

As shown in FIG. 1, a snap-on filter module 20 which conforms to the rear surface of the basic module 11 can be snapped onto the basic module 11 and tabs 101 on the snap-on unit 20 will engage slots 102 on the basic module 11 to lock the two in engagement. The contacts 47, 49, 62, 63, 66, 67, 60 and 65 of the basic module are received in aligned openings such as 103 in the snap-on unit 20 so as to make electrical connections between the snap-on unit 20 and the basic module 11. The snap-on unit 20 may include a line filter such as shown in U.S. Pat. 4,622,526 and 4,761,623 or interconnection jumpers for connecting the socket terminals 62, 64 to the switch 23 and the switch 23 to the fuse holder terminals 47, 49. A surge suppressor module 30 may also be attached to the snap-on unit 20 so as to electrically connect the basic unit, the snap-on filter unit 20 and the surge suppressor unit 20 together mechanically and electrically. The surge suppressor unit 30 may include surge suppressors so as to protect against power surges.

An input power plug is connected from the basic module 11, the snap-on filter module 20 or the snap-on surge suppressor module 30 to an electrical equipment which is to be protected by the invention.

FIGS. 3 and 4 illustrate the basic module 11 mounted in a panel 15 which has an opening that substantially is the same size as the module 11. As shown in FIG. 2, flexible fingers 110 and 111 are attached to the top of the basic unit 11 and a pair of flexible fingers 112 are also attached to the bottom of the basic unit 11 so that as the module 11 is passed through the opening in the panel 15, the fingers 110, 111 and 112 will deflect and then lock the module to the panel as illustrated in FIGS. 3 and 4, for example. An alternative arrangement is illustrated in FIG. 7 wherein flanges 121 and 122 are connected to the upper and lower edges of the module 11 and are respectively formed with openings 123 and 124 so as to allow the module 111 to be attached to the panel 15 by bolts or screws through the openings 123 and 124.

At times, the opening in the panel 15 may be longer than the basic unit 11 and under these conditions, a length extender 131 illustrated in FIGS. 1, 9 and 10 can be utilized to fill the opening in the panel 15. The extender 131 has top flexible locking fingers 132 and 133 as shown in FIG. 10 and has a portion 134 with tapered edges that is receivable in tapered guides 136 and 137 illustrated in FIG. 2 so as, together with locking fingers 110, 111 to lock an extender 131 to the basic module 11. It is to be realized that the lower portion of the basic module 11 also has locking guides 148 and 149 similar to the guides 136 and 137 so as to allow the extender 131 to be also attached to the lower end of the module if this is desired. Of course, extenders 131 may be attached to both the top and lower end if required.

FIG. 9 illustrates the invention with an extender 131 attached to the upper end of the module 11. FIG. 11 illustrates side extenders 151, 152 which have been attached to the module 11 so as to center the module 11 in an opening formed in the panel 15 which is wider than the module 11. The extenders 151 and 152 are provided with locking fingers and means for engaging the module 11 similar to those utilized with the extender 131.

FIG. 8 illustrates an embodiment where side flanges 161 and 162 which are provided with screw openings 163 and 164 are attached to the module 11 and upward and lower extenders 166 and 167 are attached to the module 11 so that the unit fits a particular size opening in a panel 15.

In use, there are three options: the module 11 or the module 11 joined with snap-on filter module 20, or the module 11 joined with snap-on filter 20 and the surge suppressor module 30. Then the unit is mounted in the opening of the panel 15 using end extenders 131 (166 and 167) and side extenders 151 and 152 depending on the size of the opening in the panel 15. The door 21 is opened and the fuse holder 26 is placed in the proper orientation for the correct voltage. Then the door 21 is closed and the power cord 61 can be connected. The input contacts of the unit are also connected to the protected equipment.

It is seen that the invention provides a novel modular power entry module capable of receiving a snap-on filter unit and a snap-on surge suppressor unit and wherein the unit can be mounted in a minimum size opening or in larger openings which are either wider or longer than the unit by attaching either length or side extenders to the unit. Alternatively, flanges may be attached to the unit for attaching it to a panel.

Although the invention has been described with respect to preferred embodiments, it is not to be so limited as changes and modifications can be made which are within the full intended scope of the invention as defined by the appended claims.

I claim as my invention:

1. A power entry module comprising a basic unit having a first opening with prongs for engaging a power cord, a fuse holder opening formed in said basic unit for receiving a fuse holder in one of two orientations, one or two fuses in said fuse holder, a safety door pivotally attached to said basic unit and when said safety door is closed over said fuse holder opening said power cord can be connected to said basic unit, said safety door can be opened only when said power cord is disconnected from said basic unit, flexible locking fingers connected to said basic unit and engageable with a panel about an opening in which said basic unit is received to lock it to said panel, and including a snap-on filter unit which is connected to said basic unit.

2. A power entry module according to claim 1 including a surge suppressor connected to said filter unit.

3. A power entry module according to claim 1 comprising, means for extending the width or length dimension of said basic unit so that it can be mounted in panel openings having different sizes.

4. A power entry module according to claim 3 wherein said means for extending the width or length of said basic unit is a flange attached to said basic unit.

5. A power entry module according to claim 3 wherein said means for extending is a width extender which is attached to said basic unit to extend its width.

6. A power entry module according to claim 3 wherein said means for extending the width or length is a length extender which is attached to said basic unit to extend its length and which has flexible locking fingers which are engageable with said panel about an opening to lock it to said panel.

7. A power entry module according to claim 6 wherein said means for extending can be attached to said basic unit by inserting a tapered member on said means for extending into a tapered slot formed on said basic unit.

8. A power entry module comprising a basic unit having a first opening with prongs for engaging a power cord, a fuse holder opening formed in said basic unit for receiving a fuse holder in one of two orientations, one or two fuses in said fuse holder, a safety door pivotally attached to said basic unit and when said safety door is closed over said fuse holder opening said power cord can be connected to said basic unit, said safety door Can be opened only when said power cord is disconnected from said basic unit, flexible locking fingers connected to said basic unit and engageable with a panel about an opening in which said basic unit is received to lock it to said panel, and including a snap-on interconnection unit which is connected to said basic unit.

* * * * *